United States Patent [19]

Walz

[11] 4,447,882

[45] May 8, 1984

[54] METHOD AND APPARATUS FOR REDUCING GRAPHIC PATTERNS

[75] Inventor: Joachim Walz, Köngen, Fed. Rep. of Germany

[73] Assignee: Siemens Aktiengesellschaft, Berlin & Munich, Fed. Rep. of Germany

[21] Appl. No.: 285,434

[22] Filed: Jul. 20, 1981

[30] Foreign Application Priority Data

Sep. 29, 1980 [DE] Fed. Rep. of Germany ....... 3036711

[51] Int. Cl.³ .......................... G06F 3/14; G06K 9/00
[52] U.S. Cl. ...................................... 364/521; 382/47
[58] Field of Search ............... 364/521; 340/731, 739; 382/47, 54, 46

[56] References Cited

U.S. PATENT DOCUMENTS

| | | | |
|---|---|---|---|
| 3,769,442 | 10/1973 | Heartz et al. | 364/521 X |
| 3,967,243 | 6/1976 | Kawa | 382/47 X |
| 4,107,780 | 8/1978 | Grimsdale et al. | 364/521 |
| 4,153,896 | 5/1979 | White | 364/521 X |
| 4,168,488 | 9/1979 | Evans | 364/521 |
| 4,181,956 | 1/1980 | Schwab et al. | 364/521 |
| 4,330,834 | 5/1982 | Murphy | 364/521 |
| 4,366,475 | 12/1982 | Kishi et al. | 364/521 X |

OTHER PUBLICATIONS

Introduction to Digital Computer Graphics For Video; Rodney Stock, SMPTE Journal, vol. 90, No. 12, pp. 1184–1189.

Primary Examiner—Edward J. Wise
Attorney, Agent, or Firm—Hill, Van Santan, Steadman & Simpson

[57] ABSTRACT

A method and apparatus are disclosed for reducing graphic patterns, coded by binary characters and represented in rows and columns of a prescribed grid, by purely electronic techniques. The reduction occurs by decrement of the binary characters. First, the binary characters representing the rows and, subsequently, the binary characters representing the columns are decremented in accordance with the desired reduction ratio. In the decrement of the binary characters, it is seen that the structure of the graphic patterns is retained to as great an extent as possible.

17 Claims, 3 Drawing Figures

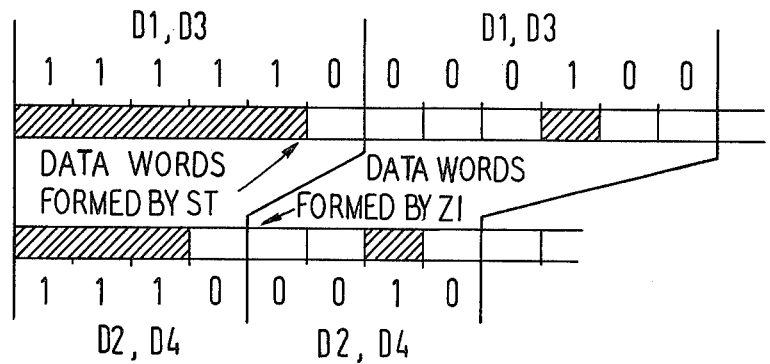
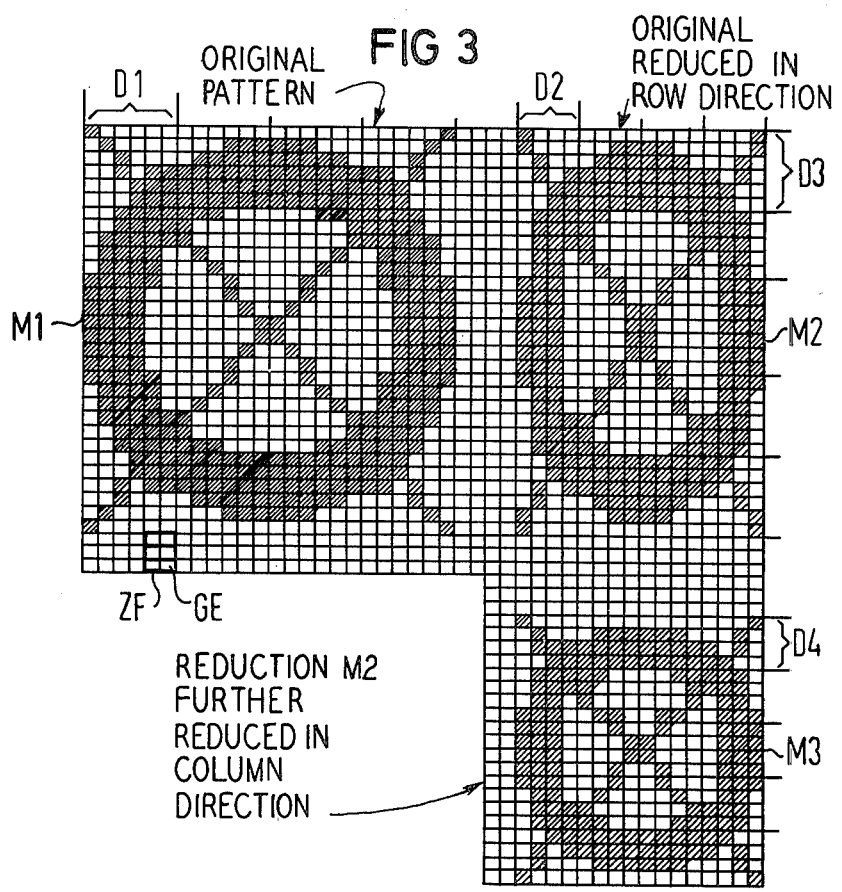

METHOD AND APPARATUS FOR REDUCING GRAPHIC PATTERNS

BACKGROUND OF THE INVENTION

1. Field of the Invention

The present invention relates to techniques, both method and apparatus, for reducing graphic patterns which are coded by binary characters and which are displayed in rows and columns of a prescribed grid.

2. Description of the Prior Art

The telecommunication service "picture screen text" offers the possibility of displaying graphic patterns on the picture screen of a television set in addition to alphanumeric characters. The graphic patterns are composed of individual graphic elements. Each page of picture screen text which can be displayed on the screen comprises 80×72=5760 graphic elements given a graphics input. Six such graphic elements are respectively combined into a character field having a size of 2×3. Therefore, there derives 40×24=960 character fields per page. The graphic patterns can be displayed in eight colors, whereby only one color is possible within a character field. The coding of the graphic patterns occurs in the grid of the character fields.

A graphic pattern can be constructed by way of an editing keyboard. Thereby, the individual graphic elements are provided via corresponding keys. Within the prescribed grid, therefore, inputs at random positions are possible until the pattern to be displayed corresponds to the desired concepts. However, a display of extensive graphic patterns by employing the editing keyboard requires a significant expense with respect to time. It is further possible to input graphic patterns by scanning a corresponding master. The scanning can occur by employing a television camera or with the assistance of a scanner which scans the master line-by-line. Advantageously, the masters are already displayed in the grid formed of the graphic elements. After scanning, the binary characters assigned to the lines of the graphic master are usually stored in a primary memory for further processing.

In case a graphic pattern which is smaller than the graphic pattern illustrated on the master is desired for producing a page, it would be conceivable to produce a new master on which the graphic pattern is illustrated in the proper size and to then again scan this master. This technique, however, requires considerable expense. Further, it would be conceivable, when scanning the master with a television camera, to provide the television camera with a zoom lens and to change the focus in such a manner that the master is imaged in the television camera with a suitable size. Such a method, however, requires a mechanical adjustment of the lens.

SUMMARY OF THE INVENTION

It is therefore the object of the present invention to provide a method and apparatus for scanning and reducing graphic patterns in a simple manner.

Given a method of the type initially mentioned, the above object is achieved through the chronological sequence of:

(a) A respective plurality m of successive binary characters of each line scanned is combined to form a first data word.

(b) A second data word is assigned to each first data word, the second data word containing a plurality n of binary characters, wherein n is smaller than m and wherein the distribution of the binary values of the binary characters in the second data word is as similar as possible to the distribution of the binary values in the first data word.

(c) The second data words are stored in an image storage.

(d) A respective plurality k of columns of the binary characters representing the graphic patterns are combined in the image memory into a third data word.

(e) A fourth data word which contains a plurality l of binary characters is assigned to each third data word, wherein l is smaller than k and wherein the distribution of the binary values of the binary characters of the fourth data word is as similar as possible to the distribution of the binary values of the respective third data word.

(f) The fourth data words are stored in the image memory and are output to an output unit.

The method of the present invention has the advantage that the change of the size of the graphic patterns occurs exclusively electronically. The change of size also occurs very fast. The production of a further master is not required and no mechanical adjustments are necessary when the master is scanned.

The method of the present invention requires a low expense when the plurality m corresponds with the plurality k and the plurality n corresponds with the plurality l and when the generation of the second and fourth data words occurs in the same manner. In this case, the size of the graphic pattern in the row direction and in the column direction is reduced in the same scale. In case the graphic patterns exhibit several colors, it is advantageous when further data words are generated which characterize the distribution of the colors. In case, for example, the plurality of all binary characters in the reduction is not uniformly changed, the further data words must determine which graphic elements are produced by which colors.

It is advantageous for the reduction of the multi-colored graphic patterns when the multi-colored graphic patterns are represented by binary characters in a manner analogous to black/white graphic patterns. For example, the color white is represented by the binary value "0", whereas all remaining colors are represented by the binary value "1".

An advantageous arrangement for implementing the method is characterized in that a control unit is provided which respectively combines the pluralities m and k of binary characters respectively into the first and third data words, respectively; in that at least one allocator is provided which allocates the second and fourth data words, respectively, to the first and third data words, respectively; and when an image memory is provided in which the second and fourth data words are inscribed.

An advantageous, first embodiment of the arrangement of the invention is achieved when the allocator contains a read only memory to whose address inputs the first and third data words, respectively, are supplied and in which the second and fourth data words, respectively, are stored.

A further, advantageous embodiment of the arrangement of the present invention is characterized in that the allocator contains a processing unit which generates the second and fourth data words, respectively, from the first and third data words, respectively, according to a prescribed algorithm.

In order to have return access to the original graphic pattern after a reduction of the graphic pattern, if need be, it is advantageous when a primary memory is preconnected to the control unit, the graphic pattern being stored line-by-line by binary characters in the primary memory.

In case the graphic patterns which have been altered in terms of size must be output in a specific format, it is advantageous when the image memory is followed by an output control which converts the fourth data words into a format suitable for an output and when the output control is followed by an output unit via an output memory, the reduced graphic pattern being capable of being output to the output unit.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 2 is an illustration of a line reduction utilizing binary characters and similar character distribution; and FIG. 3 is an illustration of a reduction of a graphic pattern in the row direction and in the column direction.

DESCRIPTION OF THE PREFERRED EMBODIMENTS

Figure 1:
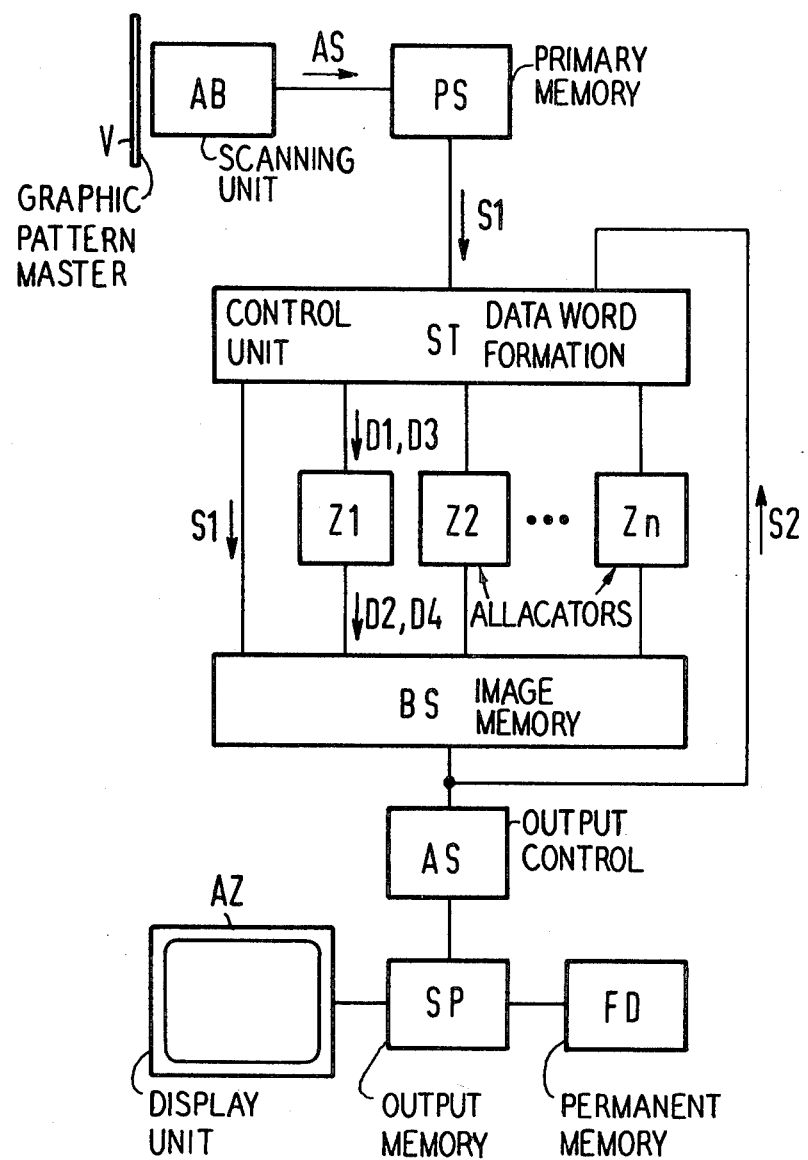
FIG. 1 is a block diagram of an arrangement for implementing the method of the present invention.

In the arrangement illustrated in FIG. 1, a master V is optically scanned line-by-line by a scanning unit AB. The scanning signals AS are supplied to a primary memory PS which stores binary characters assigned line-by-line to each scanned graphic element on the master V. In "picture screen text", all graphic elements are encoded by a plurality of binary characters in accordance with their color. For the reduction itself, without consideration of color, however, it suffices when graphic elements with the color white are represented by binary characters with the binary value "0" and graphic elements with all other colors are represented by binary characters having the binary value "1". The binary characters respectively assigned to a line are supplied as signals S1 to a control unit ST. In case the graphic patterns are to be displayed at a display unit AZ without a change of size, the signals S1 arrive by way of an image memory BS to an output control AS which converts the binary characters into an appropriate format and subsequently stores the same in an output memory SP. In addition to the display unit AZ, a permanent memory FD can also be connected to the output memory, the permanent memory FD, for example, being designed as a floppy disc device.

Given a reduction of the graphic pattern, the control unit ST respectively combines a prescribed plurality m of binary characters represented by the signals S1 into a first data word D1. The data words D1, as a function of the desired reduction, are supplied to one of the allocators Z1-Zn. The allocators Z assign data words D2 to the data words D1, the data words D2 containing a smaller plurality n of binary characters as a function of the desired reduction, whereby it must be provided that the distribution of the binary values of the binary characters in the data words D2 is as similar as possible to the distribution of the binary values of the binary characters in the data words D1.

In the representation illustrated in FIG. 2, it is assumed that a reduction of the graphic pattern to two-thirds of its size occurs. Six respective binary characters assigned to one row are combined in a data word D1. The allocator Z1 generates the data words D2 which respectively contain 4 binary characters.

The distribution of the binary values of the data words D2 is selected in such a manner that the structure of the graphic pattern of the row is retained insofar as possible.

The assignment of the data words D2 to the data words D1 occurs, by way of example, in a tabular manner. To this end, the allocators Z contain read only memories in which the data words D2 are stored and which can be called in via their address inputs by the corresponding data words D1. A selection of a corresponding table is illustrated in TABLE I.

TABLE I

| D1/D3 | D2/D4 | D5 |
|---|---|---|
| 0 0 0 0 0 0 | 0 0 0 0 | 0 0 0 0 0 0 |
| 0 0 0 0 0 1 | 0 0 0 1 | 0 0 0 0 0 1 |
| 0 0 0 0 1 0 | 0 0 0 1 | 0 0 0 0 1 0 |
| 0 0 0 0 1 1 | 0 0 0 1 | 0 0 0 0 0 1 |
| 0 0 0 1 0 0 | 0 0 1 0 | 0 0 0 1 0 0 |
| 0 0 0 1 0 1 | 0 0 1 1 | 0 0 0 1 0 1 |
| 1 1 1 0 1 0 | 1 1 0 1 | 1 1 0 0 1 0 |
| 1 1 1 0 1 1 | 1 1 0 1 | 1 1 0 0 1 1 |
| 1 1 1 1 0 0 | 1 1 1 0 | 1 1 1 0 0 0 |
| 1 1 1 1 0 1 | 1 1 0 1 | 0 1 1 0 0 1 |
| 1 1 1 1 1 0 | 1 1 1 0 | 0 1 1 1 0 0 |
| 1 1 1 1 1 1 | 1 1 1 1 | 0 1 1 1 1 0 |

In order to save memory space, the allocators Z can also contain a processing unit which, as a function of the data words D1, generates the data words D2 according to a prescribed alogrithm. In specific cases, the binary values of the data words D2 can be determined as a function of preceding of succeeding binary characters in the data words D2. An example of such an allocation is illustrated in TABLE II.

TABLE II

| D1/D3 | D2/D4 | Comment |
|---|---|---|
| 0 0 0 | 0 0 | |
| 0 0 1 | 0 1 | |
| 0 1 0 | 0 1 | when 1 procedes |
|  | 1 0 | when 0 proceeds |
| 0 1 1 | 0 1 | |
| 1 0 0 | 1 0 | |
| 1 0 1 | 1 0 | when 0 proceeds |
|  | 0 1 | when 1 proceeds |
| 1 1 0 | 1 0 | |
| 1 1 1 | 1 1 | |

Here, for a reduction to two-thirds, only three respective binary characters are combined into a data word D1 and the allocator Z1 emits data words D2 having two respective binary characters.

The allocators Z2-Zn are provided for further alteration scales. In each case, individual binary characters are removed from the data words D1 upon reductions. It is also fundamentally possible to undertake enlargements. In this case, further binary characters are added.

In case the reduction is not only to be carried out in the row direction but, rather, also in the column direction, binary characters are combined in terms of columns and read from the image memory BS and supplied to the control unit ST as signals S2. The control unit ST combines a plurality k of binary characters into data words D3 and one of the allocators Z, in a manner analogous to the data words D1, assigns data words D4 which contain a smaller plurality l of binary characters to the data words D3. Subsequently, the data words D4 are again stored in the image memory BS. The data words D4 represent the reduced graphic pattern. In case the same change occurs in the row direction and in the column direction, the same allocator Z is advantageously employed for the data words D1 and D3 to obtain the data words D2 and D4.

Subsequently, the output control AS converts the binary characters of the data words D4 into a format suitable for the output and stores the binary characters representing the graphic pattern which is fit for output in the output memory SP. The altered graphic pattern can be output to the display unit AZ, or can be stored on the storage medium of the memory FD.

In case the graphic pattern contains several colors and, given a reduction, the data words D2 and D4 contain fewer binary values "1" than the binary words D1 and D3, respectively, a decision must be made as to which color is eliminated. This occurs with the assistance of further data words D5 which are likewise illustrated in TABLE I and which are likewise generated by the allocators Z. In TABLE I, those graphic elements whose color is retained are identified with the binary value "1".

It is assumed in the illustration of FIG. 3 that a graphic pattern M1 is to be reduced to two-thirds of its size both in the row direction and in the column direction. For purpose of exemplary illustration, it is also assumed that the grahic pattern M1 contains only the colors black and white. The graphic pattern is illustrated in a grid which is suitable for scanning for the telecommunication service "picture screen test". The grid is formed of individual graphic elements GE. Six respective graphic elements GE form a character field ZF. For reasons of understanding, it is assumed that the graphic pattern is stored in the primary memory PS, whereby the color black is represented by the binary value "1" and the color white is represented by the binary value "0". As discussed above, the control unit ST reads the binary characters assigned to the rows from the primary memory PS and respectively combines six of the same into a data word D1. The allocator Z1 then generates the corresponding data word D2 which contains four binary characters. The data words D2 are subsequently stored in the image memory BS and represent the binary characters of a pattern M2. Subsequently, the binary values assigned to the columns of the pattern M2 are read from the image memory BS in order to generate the data words D3. Thereby, respectively six binary characters are likewise combined into a data word D3 and the data words D4 having four respective binary characters are assigned to the data words D3, the data words D4 representing the reduced pattern M3. The pattern M3 corresponds to the pattern M1 reduced to two-thirds of its size, whereby the pattern M3 is disposed in the same grid as the pattern M1. After appropriate processing in the output control AS, code characters are assigned to the binary characters stored in the image memory BS, the code characters being stored in the output memory SP and the reduced graphic pattern being displayable therewith at the display unit AC.

Although I have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for reducing graphic patterns which are represented by binary characters in rows and columns of a prescribed grid, comprising the steps of:
   (a) for each row, combining a plurality m of successive binary characters of a row into a first data word D1;
   (b) for each first data word D1, forming a second data word D2 having n binary characters, with the number n being less than the number m and the binary value distribution of the second data word DZ being as similar as possible to the binary value distribution of the first data word D1;
   (c) storing the second data words D2;
   (d) for each column represented by the stored second data words D2, forming a third data word D3 by combining a plurality k of successive binary characters;
   (e) for each third data word D3, forming a fourth data word D4 having l binary characters with the number l being less then the number k and the binary value distribution of the fourth data word D4 being as similar as possible to the binary value distribution of the third data word D3;
   (f) storing the data words D4, which now represent a reduction of the original graphic pattern in the same prescribed grid; and
   (g) applying the data words D4 to a utilization device.

2. The method of claim 1, and further defined by the step of:
   (h) selecting the number m to be equal to the number k.

3. The method of claim 1, and further defined by the step of:
   (h) selecting the number n to be equal to the number l.

4. The method of claim 1, and further defined by the steps of:
   (h) selecting the number m to be equal to the number k; and
   (i) selecting the number n to be equal to the number l.

5. The method of claim 1, for reducing multicolor graphic patterns, and further comprising the step of:
   (h) generating fifth data words DS having binary values representing the colors to be retained in the reduction.

6. The method of claim 5, and further comprising the step of:
   (i) applying the fifth data words DS to a utilization device.

7. Apparatus for reducing graphic patterns which are represented in a prescribed grid of elements disposed in columns and rows said apparatus comprising:
   scanning means for scanning a graphic pattern row-by-row and producing binary characters representing the respective element content;
   a memory for storing data words;
   utilization means connected to said memory for utilizing the data words stored in said memory; and reduction means connected to said scanning means and said memory and operable to provide data words to said second memory representing a reduction of the graphic pattern, said reduction means comprising first means connected to said scanning means and operable to receive binary characters therefrom and form first data words D1 having m successive binary characters, second means connected between said first means and said memory, and operable to form second data words D2 of n binary characters from the first data words D1 with the number n being less than the number m and with a binary value distribution which is as similar as possible to the binary value distribution of the first data words D1 and to store the second data words D2 in said memory on a row-by-row basis, said first means connected to said memory and operable to form from successive binary values of the second data words D2, on a column-by-column basis, third data words D3 having k binary characters and to apply the same to said second means which is further operable to form from the third data words D3 fourth data words D4 each having l binary characters with the number l being less than the number k and a binary value distribution which is as similar as possible to the binary value distribution of the respective third data words D3, and to store the same in said memory.

8. The apparatus of claim 7, wherein: said second means comprises read only memory means storing the second data words D2 and the fourth data words D4 and operable to emit the same in response to the receipt of the first data words D1 and the third data words D3, respectively, as addresses.

9. The apparatus of claim 7, and further comprising: a further memory connected between said scanning means and said first means.

10. The apparatus of claim 7, wherein said utilization means comprises:
an output unit requiring a predetermined data format; and an output control for converting the binary characters of the fourth data words into the required format.

11. The apparatus of claim 10, wherein said output means comprising:
a display unit.

12. The apparatus of claim 10, wherein said output means comprises:
a memory.

13. The apparatus of claim 10, wherein said output means comprises:
a floppy disk unit.

14. A method for changing the size of graphic patterns which are represented by binary characters in rows and columns of a prescribed grid, comprising the steps of:
(a) for each row, combining a plurality m of successive binary characters of a row into a first data word D1;
(b) for each first data word D1, forming a second data word D2 having n binary characters, with the binary value distribution of the second data word D2 being as similar as possible to the binary value distribution of the first data word D1;
(c) storing the second data word D2;
(d) for each column represented by the stored second data words D2, forming a third data word D3 by combining a plurality k of successive binary characters;
(e) for each third data word D3, forming a fourth data word D4 having l binary characters, with the binary value distribution of the fourth data word D4 being as similar as possible to the binary value distribution of the third data word D3;
(f) storing the data words D4, which now represent a reduction of the original graphic pattern in the same prescribed grid; and
(g) applying the data words D4 to a utilization device.

15. A method for changing the size of graphic patterns which are represented by binary characters in rows and columns of a prescribed grid, comprising the steps of:
(a) for each row, combining a plurality m of successive binary characters of a row into a first data word D1;
(b) for each first data word D1, forming a second data word D2 having n binary characters, with the binary value distribution of the second data word D2 being as similar as possible to the binary value distribution of the first data word D1;
(c) storing the second data words D2;
(d) for each column represented by the stored second data words D2, forming a third data word D3 by combining a plurality k of successive binary characters including selecting the number k to be equal to the number m;
(e) for each third data word D3, forming a fourth data word D4 having l binary characters, with the binary value distribution of the fourth data word D4 being as similar as possible to the binary value distribution of the third data word D3;
(f) storing the data words D4, which now represent a reduction of the original graphic pattern in the same prescribed grid; and
(g) applying the data words D4 to a utilization device.

16. A method for changing the size of graphic patterns which are represented by binary characters in rows and columns of a prescribed grid, comprising the steps of:
(a) for each row, combining a plurality m of successive binary characters of a row into a first data word D1;
(b) for each first data word D1, forming a second data word D2 having n binary characters, with the binary value distribution of the second data word D2 being as similar as possible to the binary value distribution of the first data word D1;
(c) storing the second data words D2;
(d) for each column represented by the stored second data words D2, forming a third data word D3 by combining a plurality k of successive binary characters including the number k to be equal to the number m;
(e) for each third data word D3, forming a fourth data word D4 having l binary characters including selecting the number l to be equal to the number n, and the binary value distribution of the fourth data word D4 being as similar as possible to the binary value distribution of the third data word D3;

(f) storing the data words D4, which now represent a reduction of the original graphic pattern in the same prescribed grid; and (g) applying the data words D4 to a utilization device.

17. Apparatus for changing the size of graphic patterns which are represented in a prescribed grid of elements disposed in columns and rows, said apparatus comprising:

scanning means for scanning a graphic pattern row-by-row and producing binary characters representing the respective element content;

a memory for storing data words;

utilization means connected to said memory for utilizing the data words stored in said memory; and reduction means connected to said scanning means and said memory and operable to provide data words to said second memory representing a reduction of the graphic pattern, said reduction means comprising first means connected to said scanning means and operable to receive binary characters therefrom and form first data words D1 having m successive binary characters, second means connected between said first means and said memory and operable to form second data words D2 of n binary characters from the first data words D1 and with a binary value distribution which is as similar as possible to the binary value distribution of the first data words D1 and to store the second data words D2 in said memory on a row-by-row basis, said first means connected to said memory and operable to form from successive binary value of the second data words D2, on a column-by-column basis, third data words D3 having k binary characters and to apply the same to said second means which is further operable to form from the third data words D3 fourth data words D4 each having l binary characters and a binary value distribution which is as similar as possible to the binary value distribution of the respective third data words D3, and to store the same in said memory.

* * * * *